(12) United States Patent
Hashimoto et al.

(10) Patent No.: US 8,478,443 B2
(45) Date of Patent: Jul. 2, 2013

(54) ROBOT SYSTEM

(75) Inventors: Yasuhiko Hashimoto, Kobe (JP); Kenji Bando, Kobe (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 94 days.

(21) Appl. No.: 13/148,623

(22) PCT Filed: Feb. 8, 2010

(86) PCT No.: PCT/JP2010/052123
§ 371 (c)(1),
(2), (4) Date: Aug. 9, 2011

(87) PCT Pub. No.: WO2010/090351
PCT Pub. Date: Aug. 12, 2010

(65) Prior Publication Data
US 2011/0313571 A1   Dec. 22, 2011

Related U.S. Application Data

(60) Provisional application No. 61/202,235, filed on Feb. 9, 2009.

(51) Int. Cl.
*G05B 19/00* (2006.01)
*G05D 23/00* (2006.01)

(52) U.S. Cl.
USPC ........... 700/258; 700/245; 700/247; 700/250; 700/253; 700/254; 700/256; 700/257; 700/261; 700/900

(58) Field of Classification Search
None
See application file for complete search history.

(56) References Cited

U.S. PATENT DOCUMENTS

| | | | |
|---|---|---|---|
| 2006/0181092 A1* | 8/2006 | Kikut et al. | 294/2 |
| 2007/0142967 A1* | 6/2007 | Volcic et al. | 700/245 |
| 2008/0150467 A1* | 6/2008 | Hashimoto et al. | 318/568.17 |
| 2008/0255704 A1* | 10/2008 | Braut | 700/264 |

FOREIGN PATENT DOCUMENTS

| | | |
|---|---|---|
| JP | A-60-104695 | 6/1985 |
| JP | U-02-150194 | 12/1990 |
| JP | A-06-134689 | 5/1994 |
| JP | A-11-090883 | 4/1999 |
| JP | A-2001-156147 | 6/2001 |

OTHER PUBLICATIONS

International Search Report in International Application No. PCT/JP2010/052123; dated May 18, 2010.
Written Opinion of the International Searching Authority in International Application No. PCT/JP2010/052123; dated May 18, 2010.
Sep. 24, 2012 Office Action issued in Taiwanese Patent Application No. 099103976 (with translation).

* cited by examiner

*Primary Examiner* — Ian Jen
(74) *Attorney, Agent, or Firm* — Oliff & Berridge, PLC

(57) ABSTRACT

The present invention provides a robot system including a robot having a plurality of move axes and a safeguard apparatus provided independently of a control system of the robot and adapted for limiting a movable range of the robot. The safeguard apparatus includes at least two individual-axis-detection external sensors configured to be respectively turned ON/OFF in response to a rotational position or a transfer position of respective at least two move axes among the plurality of move axes of the robot, and an apparatus body configured to limit a move of the robot based on a combination of ON/OFF conditions of at least two output signals obtained from the at least two individual-axis-detection external sensors.

16 Claims, 5 Drawing Sheets

PRESENT EMBODIMENT

COMPARATIVE EXAMPLE

ROBOT SYSTEM

TECHNICAL FIELD

The present invention relates to a robot system including a robot having a plurality of move axes, and a safeguard apparatus adapted for limiting a movable range of the robot.

BACKGROUND ART

In each of Japan, USA, Europe, Asian and other countries, a standard for industrial robots is established, based on and/or referring to IS013849-1 (Safety of machinery, Safe related Parts of Control Systems Parts 1 General Principles for Design).

In this standard, a requirement for the safety of the industrial robot has become strict, more and more, in recent years. Specifically, in order to protect workers from the robot, it is necessary to prepare a safeguard apparatus or the like equipment outside the operable or transfer range of the robot and/or articles to be transported by the robot. Or, it is necessary to make the safeguard apparatus strong enough to be durable against an impact and/or damage caused by any collisions with the robot.

Usually, however, the movable area in which the robot can be used or operated is considerably limited. Therefore, in some cases, it is quite difficult to provide an adequate space for installing the safeguard apparatus outside such a limited movable range of the robot. Meanwhile, the approach for rendering the safeguard apparatus insusceptible or durable to the impact caused by the collision with the robot may often be impractical from the viewpoint of cost and time required for construction.

Namely, the installment of the safeguard apparatus in a place outside the movable range of the robot as well as the attempt of rendering the safeguard apparatus durable or insusceptible to the damage due to the collision with the robot may often be impractical and/or quite difficult.

DISCLOSURE OF INVENTION

The present invention was made in light of the above problems. Therefore, it is an object of this invention to provide a robot system which can limit the movable range of the robot into a predetermined area or space by utilizing relatively simple construction.

In order to achieve the above object, the robot system (1) of this invention includes a robot having a plurality of move axes and a safeguard apparatus provided independently of a control system of the robot and adapted for limiting a movable range of the robot. The safeguard apparatus includes at least two individual-axis-detection external sensors configured to be respectively turned ON/OFF in response to a rotational position or a transfer position of respective at least two move axes among the plurality of move axes of the robot, and an apparatus body configured to limit a move of the robot based on a combination of ON/OFF conditions of at least two output signals obtained from the at least two individual-axis-detection external sensors.

In one aspect (2) of the robot system (1), each of the plurality of move axes of the robot is provided with at least two individual-axis-detection external sensors.

In another aspect (3) of the robot system (1) or (2), each of the individual-axis-detection external sensors includes a contact or non-contact projection and a projection detector configured to detect the projection, a relative position between the projection and the projection detector being changed according to the rotational position or the transfer position of each of the plurality of move axes of the robot.

In another aspect (4) of any one of the robot systems (1) to (3), the plurality of move axes include at least three move axes. The safeguard apparatus further includes a composite-move-detection external sensor adapted for detecting a predetermined movable position of the robot provided by composite moves of at least two move axes among the plurality of move axes of the robot.

Alternatively, in order to achieve the above object, the robot system (5) of this invention includes a robot having a plurality of move axes and a safeguard apparatus provided independently of a control system of the robot and adapted for limiting a movable range of the robot. The safeguard apparatus includes a composite-move-detection external sensor configured to detect a predetermined movable position of the robot provided by composite moves of at least two move axes among the plurality of move axes of the robot, and an apparatus body configured to limit a move of the robot based on an output signal obtained from the composite-move-detection external sensor.

In one aspect (6) of the robot system (4) or (5), the plurality of move axes include three or more move axes. The robot has an arm that can be rotated about or moved along a first axis that is one of the plurality of move axes. The composite-move-detection external sensor is configured to detect the predetermined movable position provided by the composite moves of at least two move axes other than the first axis among the plurality of move axes.

In one aspect (7) of the robot system (6), an end effector, which can be rotated about a wrist axis that is one of the plurality of move axes, is provided at a distal end of the arm. The predetermined movable position detected by the composite-move-detection external sensor is a position of the end effector.

In one aspect (8) of the robot system (7), the composite-move-detection external sensor includes a first unit configured to be rotated together with the arm rotated about the first axis, or to be moved together with the arm moved along the first axis, and a second unit configured to be moved together with the end effector, the predetermined movable position being detected by detecting that the first unit and the second unit have a predetermined positional relationship to each other.

In one aspect (9) of the robot system (8), the first unit includes a light emission part configured to emit a detection beam and a light receiving part configured to receive the detection beam, the second unit including a reflector configured to reflect the detection beam emitted from the light emission part toward the light receiving part when the robot is in the predetermined movable position.

In another aspect (10) of any one of the robot systems (6) to (9), the predetermined movable position corresponds to a position in which the arm is retracted.

In another aspect (11) of any one of the robot systems (6) to (10), the safeguard apparatus is configured to prohibit the robot from being rotated about the first axis or to prohibit the robot from being moved along the first axis, except for a case in which the robot is in the predetermined movable position.

In another aspect (12) of any one of the robot systems (4) to (11), the composite-move-detection external sensor includes a contact or non-contact projection and a projection detector configured to detect the projection, a relative position between the projection and the projection detector being changed according to a movable position of the robot.

In another aspect (13) of any one of the robot system (4) to (12), the composite-move-detection external sensor is provided, in at least two, to one predetermined movable position.

In another aspect (14) of any one of the robot systems (1) to (13), the apparatus body includes an external safety PLC having a power source different from a power source of the robot.

In another aspect (15) of any one of the robot systems (1) to (14), the safeguard apparatus includes a power source different from a power source of the robot, the safeguard apparatus shutting off the power source of the robot when the robot moves out of a safe working area.

In another aspect (16) of any one of the robot systems (1) to (15), the safeguard apparatus is configured to limit the move of the robot, such that each transfer range of the arm of the robot, the end effector provided to the distal end of the arm and an article held by the end effector to be transported can be kept within a safe working area.

BEST MODE FOR CARRYING OUT THE INVENTION

Hereinafter, the robot system according to an embodiment of the present invention will be described with reference to the drawings.

Figure 1:
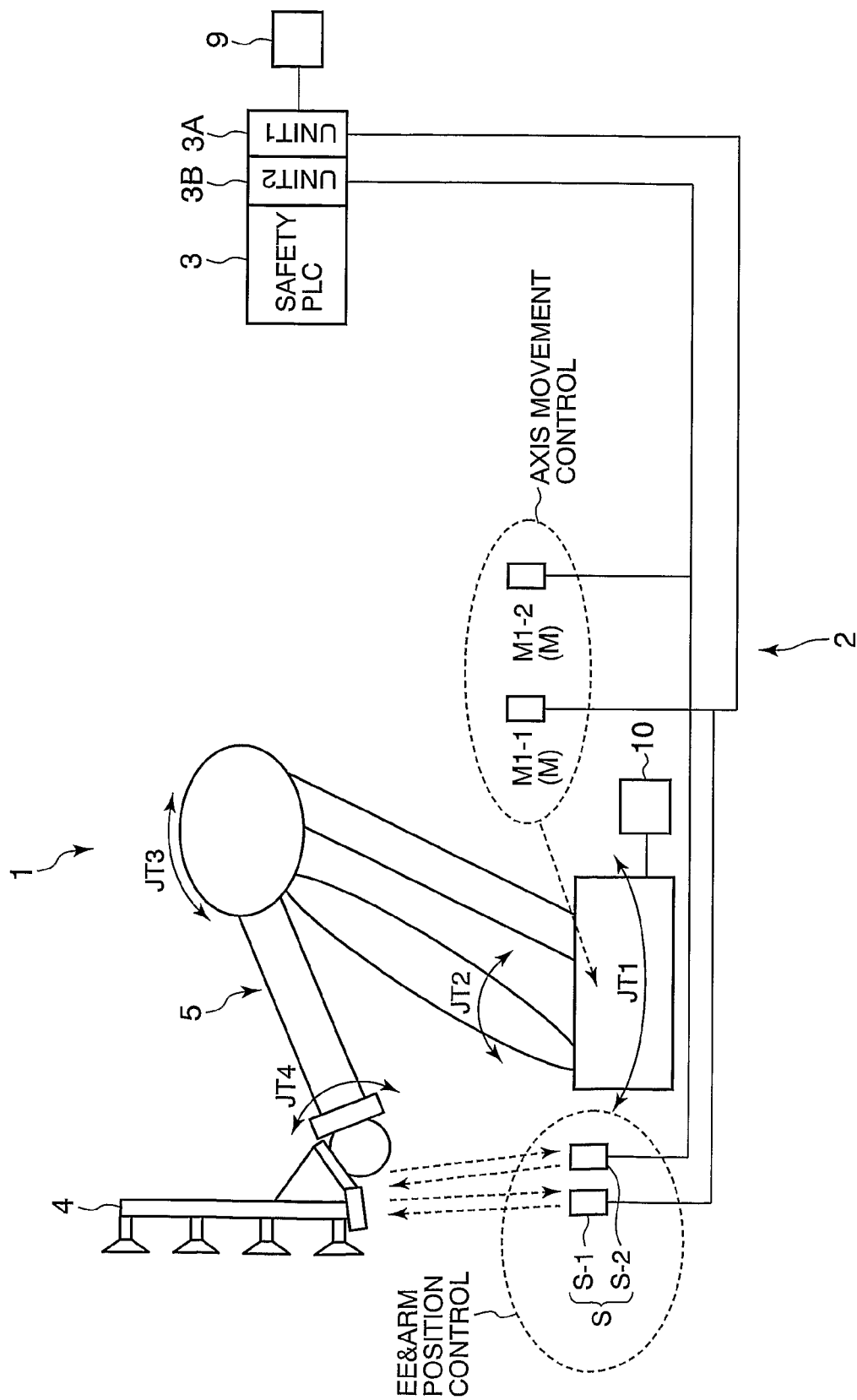
FIG. 1 is a schematic diagram for illustrating a robot system related to one embodiment of the present invention.

As shown in FIG. 1, the robot system according to this embodiment includes the robot 1 having the plurality of move axes (in this embodiment, six axes) and the safeguard apparatus 2 provided separately and independently relative to a control system of the robot 1, and adapted for limiting the movable range of the robot 1. The safeguard apparatus 2 is composed of an externally installed safety PLC (an apparatus body) 3 having a power source 9 provided separately from a power source 10 for the robot 1, and various sensors M, S that will be described later.

Figure 2:
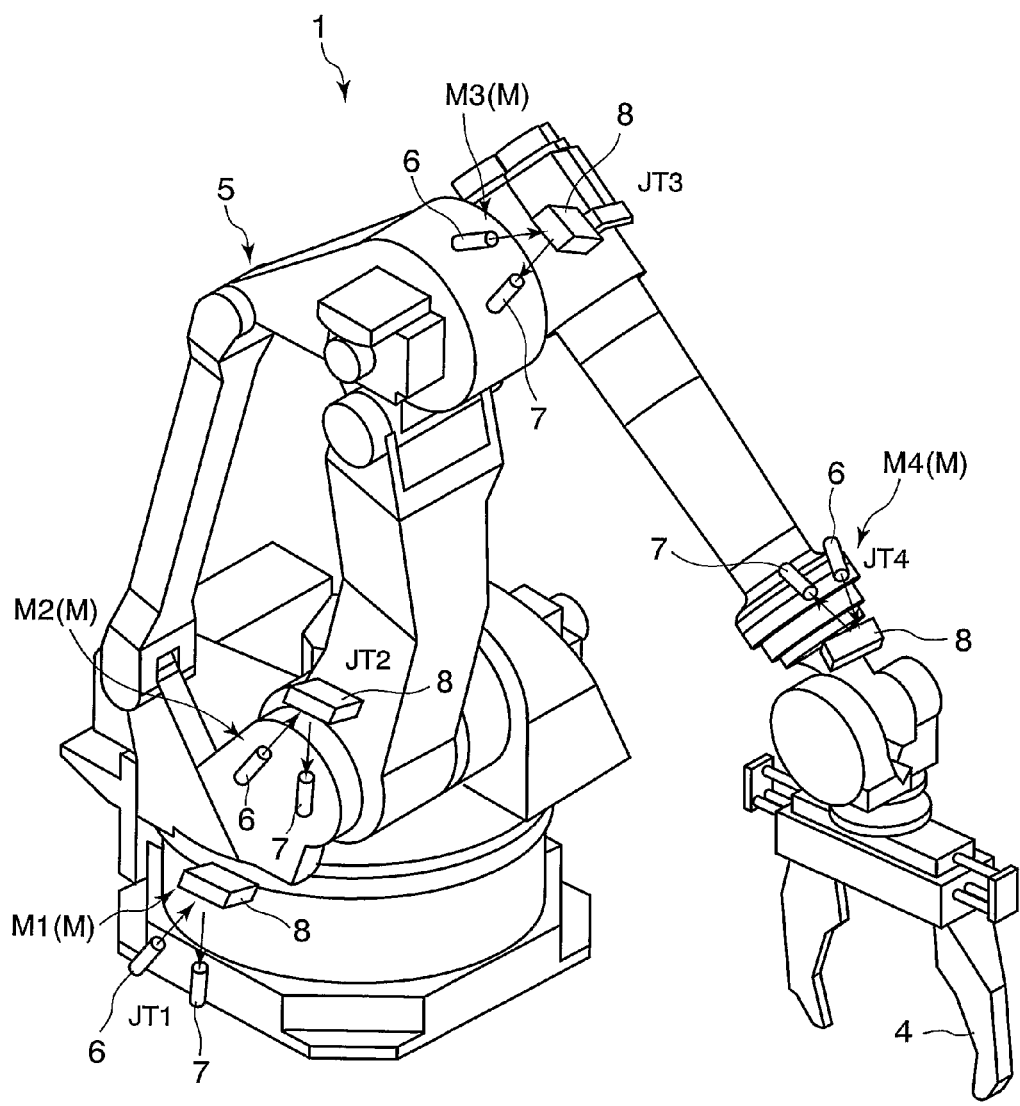
FIG. 2 is a schematic perspective view of the robot system related to the embodiment of the present invention.

As shown in FIG. 2, individual-axis-detection external sensors M1, M2, M3, M4 are respectively provided to a first axis (or turning axis) JT1, a second axis (or laterally moving axis) JT2, a third axis (or vertically moving axis) JT3 and a fourth axis JT4, among the aforementioned move axes of the robot 1. Each of the individual-axis-detection external sensors M1, M2, M3, M4 can serve to detect each corresponding axis, and is designed to be turned ON/OFF in response to the rotational position of the individual axis. For convenience, these sensors will be sometimes collectively referred to as the individual-axis-detection external sensors M.

In this embodiment, the individual-axis-detection external sensors M are provided in two (or in a dual or two-sensor system), to one move axis of the robot 1. For instance, as shown in FIG. 1, two individual-axis-detection external sensors M1-1, M1-2 are provided to the first axis JT1. In this case, an output signal of the individual-axis-detection external sensor M1-1 is sent to a first unit 3A of the safety PLC 3, while the output signal of the individual-axis-detection external sensor M1-2 is sent to a second unit 3B of the safety PLC 3.

Figure 3B:
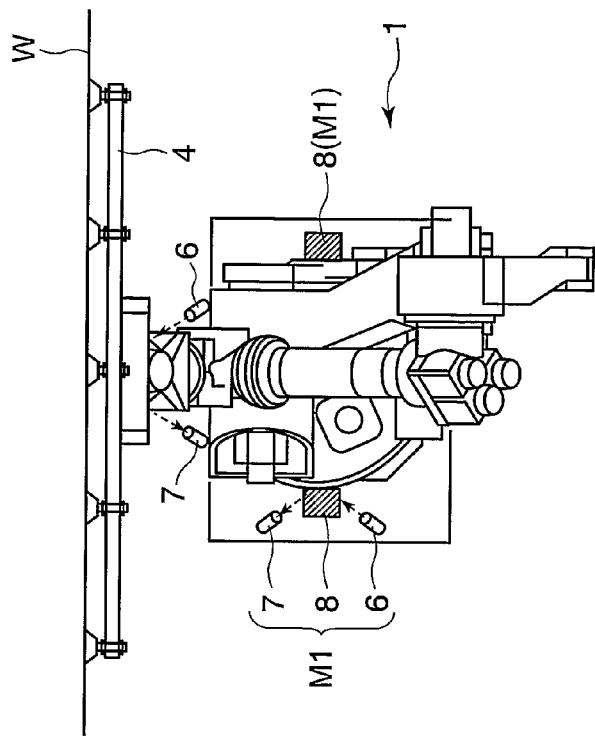
FIG. 3B is a plan view of the robot system shown in FIG. 3A.
Figure 3A:
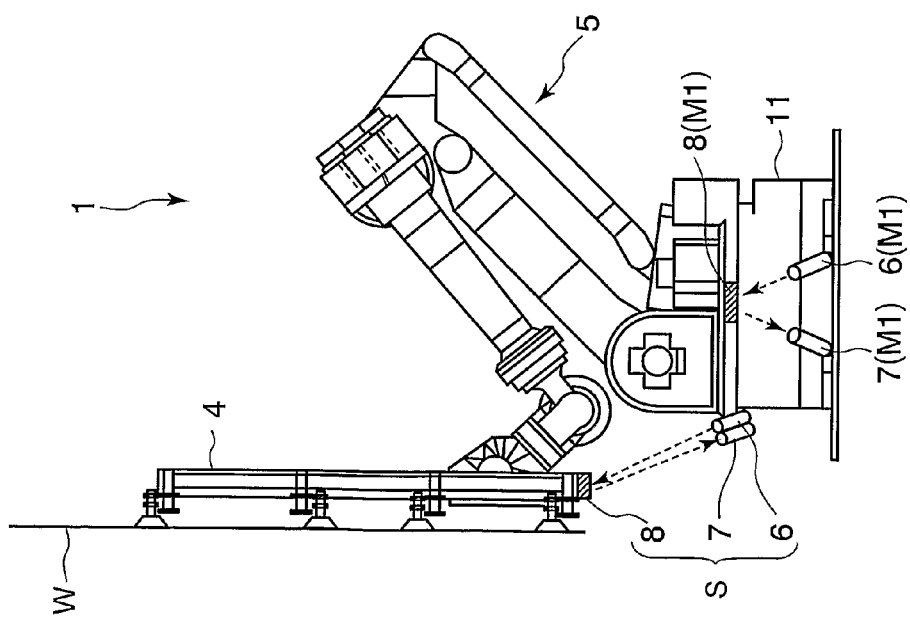
FIG. 3A is a schematic side view of the robot system related to the embodiment of the present invention.

In this embodiment, as shown in FIGS. 1, 3A and 3B, composite-move-detection external sensor S is further provided to the robot system. Each of the composite-move-detection external sensor S can serve to detect a predetermined movable position of the robot 1 provided by the composite moves of at least two move axes among the plurality of move axes of the robot 1. In order to enhance the safety level, the composite-move-detection external sensors are provided in two, i.e., S-1, S-2 (or in a two-sensor system), to the robot system.

In this embodiment, the provision of the above composite-move-detection external sensor S enables collective detection of respective positions of an end effector 4 and all of the axes JT2 to JT6 except for the first axis JT1. More specifically, as shown in FIG. 3A, the composite-move-detection external sensor S can detect that the arm 5 of the robot 1 is retracted.

The end effector 4 is attached to the wrist axis (or sixth axis) provided at the distal end of the arm 5. It is noted that the end effector 4, as shown in FIGS. 1, 3A and 3B, is provided for transporting a large-sized glass substrate W, while keeping the substrate W attached thereto by suction. Alternatively, as depicted in FIG. 2, the end effector 4 may be configured for grasping an article or object to be transported.

As shown in FIGS. 3A, 3B, the composite-move-detection external sensor S includes a light emission part 6 and a light receiving part 7, respectively rotated with the rotation of the arm 5 about the first axis JT1, and further includes a mirror (or mirrors) 8 moved together with the end effector 4.

In this case, a state in which the arm 5 is in a retracted position can be detected, when the composite-move-detection external sensor S-1 (or S-2) detects a predetermined positional relationship among the light emission part 6, light receiving part 7 and mirror 8. Namely, only when the arm 5 is in the retracted position, a light beam emitted from the light emission part 6 and reflected by the mirror 8 can be inputted into the light receiving part 7.

In this embodiment, as shown in FIGS. 2, 3A and 3B, each of the individual-axis-detection external sensors M1 to M4 is also composed of the light emission part 6, light receiving part 7 and mirror 8.

For instance, as shown in FIGS. 3A, 3B, the individual-axis-detection external sensor M1 includes the light emission part 6 and light receiving part 7, respectively fixed in position to a base 11 of the robot 1, and further includes a pair of mirrors 8 respectively provided to be turned, together with the arm 5, about the first axis JT1. The pair of mirrors 8 (M1) are arranged to be symmetrical with respect to the first axis JT1 on a line extending in parallel with the second axis JT2 and crossing the first axis JT1.

Accordingly, the individual-axis-detection external sensor M1 is turned ON, only when the robot 1 is in either one of two positions (i.e.; a forward-facing position and a backward-facing position) angularly spaced by 180° about the first axis JT1.

In place of using the light emission part 6, light receiving part 7 and mirror (or mirrors) 8, for respectively constituting each of the composite-move-detection external sensor S and/or individual-axis-detection external sensors M, one exemplary variation of each sensor S and/or M may be composed of a contact or non-contact projection and a projection detector for detecting the projection. In this case, the positional relationship between the projection and the projection detector will be changed according to the rotational position of each move axis of the robot 1.

As described above, the safeguard apparatus 2 includes the individual-axis-detection external sensors M, composite-move-detection external sensor S and safety PLC 3. In this case, each output signal of the individual-axis-detection external sensors M and composite-move-detection external sensor S is sent to the safety PLC 3. Then, the safety PLC 3 will limit the move of the robot 1, based on the combination of ON/OFF conditions of the respective output signals.

In this way, the move of the robot 1 is limited, such that the transfer ranges of the arm 5 of the robot 1, the end effector 4 provided at the distal end of the arm 5 and the article W held by the end effector 4 can be respectively kept within the safe working area.

As shown in FIG. 1, the safety PLC 3 includes the power source 9 different from the power source 10 of the robot 1. Therefore, this safety PLC 3 can shut off the power source 10 of the robot 1 and stop the move thereof, before the robot 1 moves out of the safe working area, even in the case in which the control system of the robot 1 runs out of control.

Next, one specific example of limiting the move of the robot 1 will be discussed with reference to FIGS. 4 and 5.

Figure 4:
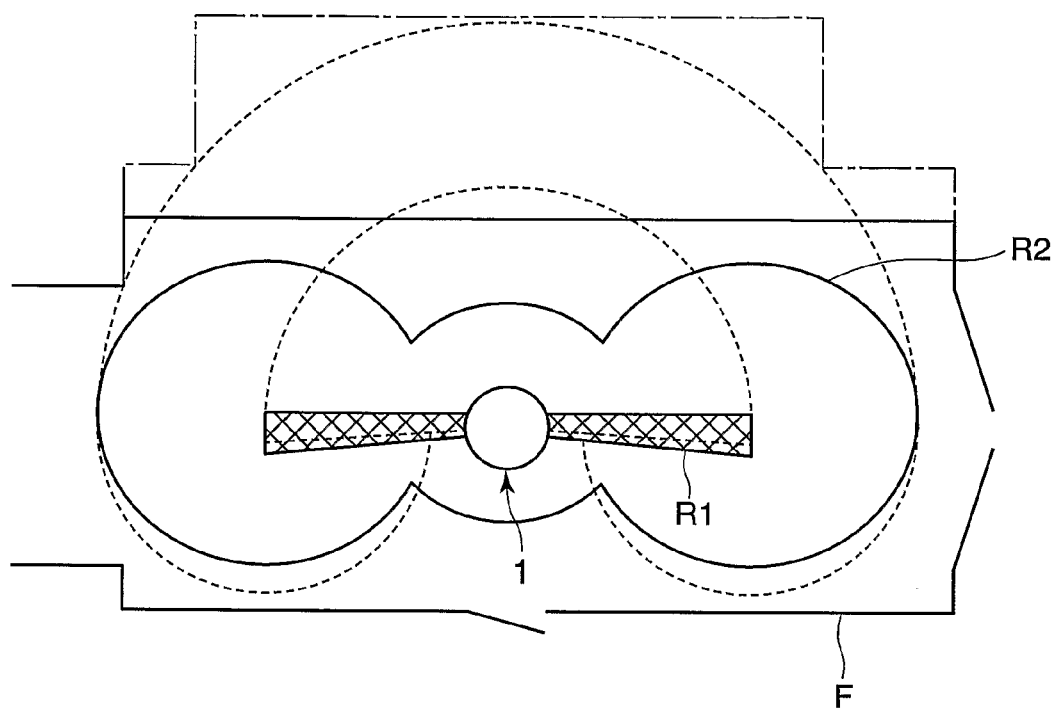
FIG. 4 is a plan view for illustrating the move of the robot system related to the embodiment of the present invention.

In FIG. 4, a movable range R1 of the arm 5 of this embodiment and another movable range R2 of the article W to be transported are respectively shown by solid lines. In FIG. 5, the movable range R1' of the arm 5, as a comparative example (i.e., the move of this arm 5 is not limited), and the movable range R2' of the article W are respectively designated by solid lines (each corresponding to a dotted line depicted in FIG. 4).

Figure 5:
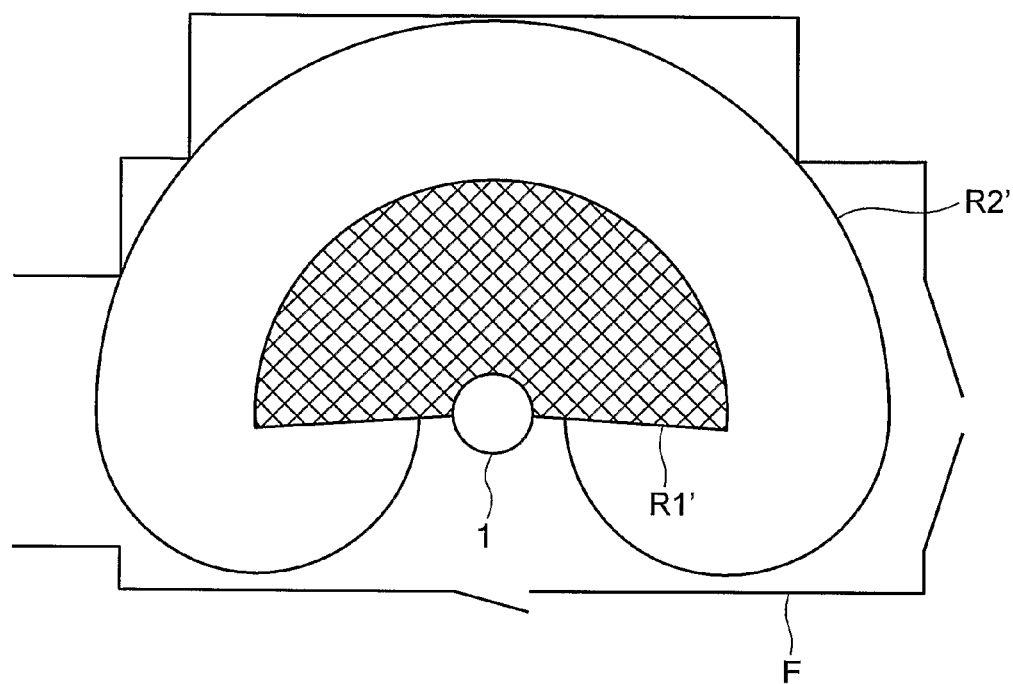
FIG. 5 is a plan view for illustrating the move of the robot system related to a comparative example.

It is noted that reference character F shown in FIGS. 4 and 5 denotes the safeguard apparatus, wherein the aforementioned safe working area is set within the safeguard apparatus F.

As one aspect of limiting the move of the robot 1 in this embodiment, the safety PLC 3 prohibits the arm 5 from being rotated about the first axis JT1, except for the case in which the composite-move-detection external sensor S detects that the arm is retracted (i.e., the sensor S is ON). Further, the safety PLC 3 prohibits the retracted arm 5 from being extended, except for the case in which the individual-axis-detection external sensor M1 for the first axis is ON.

Accordingly, if the control system for the robot 1 runs out of control, and then both of the composite-move-detection external sensor S and individual-axis-detection external sensor M1 for the first axis are turned OFF, the move of the robot 1 can be stopped by the safety PLC 3.

Further, if each of the individual-axis-detection external sensors M2 to M4 for the second to fourth axes is set to be turned ON when the arm 5 is in the retracted position, whether or not the arm 5 is retracted can also be detected by such individual-axis-detection external sensors M2 to M4. For instance, when both of the individual-axis-detection external sensor M1 for the first axis and any one of the individual-axis-detection external sensors M2 to M4 for the second to fourth axes are respectively turned OFF, the move of the robot 1 can be stopped by the safety PLC 3.

By limiting the move of the robot 1 as described above, the turning movement of the robot 1 about the first axis can be securely prevented, except for the case in which the arm 5 is in the retracted position and hence the sensors M2 to M4 are all turned ON.

As apparently seen from the comparison between the movable ranges R1, R2 of this embodiment respectively depicted in FIG. 4 and the movable ranges R1', R2' of the comparative example respectively depicted in FIG. 5, either of the movable range R1 of the arm 5 and the movable range R2 of the article W to be transported in this embodiment is limited to a great extent (or substantially minimized), as compared with the case of the comparative example. Thus, the space or dimensions required for installing the safeguard apparatus F around the robot 1 can be significantly reduced.

As stated above, in this embodiment, the safety PLC 3 can limit the move of the robot 1, based on each signal of the individual-axis-detection external sensors M and composite-move-detection external sensor S, respectively provided separately and independently relative to the control system of the robot 1, every time the control system of the robot 1 runs out of control and thus the arm 5 and/or article W is about to be moved out of the safe working area. Therefore, the move of the arm 5 and/or article W out of the safe working area can be securely prevented.

Further, in this embodiment, the state in which the arm 5 is in the retracted position can be detected by a single sensor (i.e., the composite-move-detection external sensor S-1 or S-2). Namely, the state in which the five axes (JT2 to JT6) except for the first axis JT1 are respectively in predetermined rotational positions can be detected by the single sensor. Therefore, this configuration can eliminate a need for providing individual sensors for all of the five axes (JT2 to JT6), thus significantly simplifying the whole structure and reducing the cost.

Additionally, in this embodiment, the move of the robot 1 can be limited, based on the combination of the conditions of the output signals respectively obtained from the individual-axis-detection external sensors M and composite-move-detection external sensor S. Therefore, the movable range of the robot 1 can be readily set more adequately and accurately.

While the first axis JT1 in the above embodiment has been described as the rotation axis (i.e., the axis extending in the vertical direction) of the arm 5, this axis may be provided as a travel axis (i.e., the axis extending in the horizontal direction) in one variation. In this case, for example, one unit of the two external sensors is located in each of two (or more) predetermined positions on the travel axis, while the other unit is attached to the robot 1. Further, in this configuration, the arm 5 can be extended, only when the other unit detects the one unit.

Hereinafter, the present invention will be described supplementally.

According to one example of this invention, the following challenges can be solved.

(1) A challenge of satisfying the original standard prescribed in ISO13849-1 and other standards derived therefrom and/or those referring thereto, as well as ensuring and facilitating adequate correspondence to the same or equivalent requirement of a new standard that will succeed to the above original standard in the future.

(2) Another challenge of saving or reducing the space required for installing the robot system.

(3) Still another challenge of rendering the space for the installment more flexible in use.

(4) Still another challenge of reducing the cost.

One example of the present invention is configured as follows:

(1) In this example, the robot system includes the robot having any given number of move axes, wherein the individual-axis-detection external sensors, each satisfying Category 3 prescribed in ISO13849-1, are provided to one or more of the rotation axes, and wherein, for example, two sensors (e.g., one sensor is a contact or non-contact projection and the other sensor is a projection detector) are provided for each move axis (e.g., the one sensor is provided to a fixed part or portion relative to the move axis, while the other sensor is provided to a movable part or portion of the move axis). In this case, the two sensors can be turned ON/OFF in response to the relative position thereof (e.g., the relative position between the projection and the projection detector). Further, in this example, the output of each sensor is connected with the external safety PLC also satisfying Category 3 of IS013849-1 and connected with the power source different from the power source used for the robot, thus having no relation to the movable condition of the robot. In this configuration, the external PLC is provided to occasionally shut off the main power source of the robot, while optionally keeping the main power source of the robot in the ON state, based on the combination of ON/OFF conditions of the output signals sent from the respective sensors. Therefore, the maximum movable range, in which the robot can be operated, while the safety PLC keeps the power source for the robot in the ON state, based on the ON/OFF conditions, as well as the maximum transfer range, in which the article to be transported, end effector and the like can be safely transferred and/or actuated, can be respectively set more accurately and efficiently. Thus, such a maximum operable and/or transfer range can be significantly reduced into a more compact area and/or space, as compared with the range that is not limited by the aforementioned control based on the ON/OFF conditions of the respective sensors. As such, in this example of the present invention, the safeguard apparatus for the robot can be installed, more safely and securely.

(2) In this example (1), the standard (or reference standard) that is referred to by the robot system includes the standards derived from IS013849-1 and those referring thereto.

(3) In the above example (1), the reference standard further includes new standards including the requirement that is the same or equivalent to the requirement of the original standard of IS013849-1, in the case in which the new standards will be provided after the original standard is revised in the future.

(4) Another example of the robot system includes the robot having three or more move axes, wherein the sensors, each satisfying Category 3 prescribed in IS013849-1, are provided to one or more of the move axes, and wherein, for example, two sensors (e.g., one sensor is the contact or non-contact projection and the other sensor is the projection detector) are provided for each move axis (e.g., the one sensor is provided to the fixed part or portion relative to the move axis, while the other sensor is provided to the movable part or portion of the move axis). In this case, the two sensors can be turned ON/OFF in response to the relative position thereof (e.g., the relative position between the projection and the projection detector). In addition, through-beam-type sensors, each satisfying the above Category 3, are provided to a part or all of the axes not provided with the aforementioned sensors. Further, reflecting mirrors are provided to positions respectively corresponding to any given point or points (that can be provided by composite-move of the plurality of move axes to be detected) of the distal end or intermediate portion of the arm and/or tool, such as the end effector or the like, located at an distal end of the robot. With this configuration, only when a certain axis to be detected of the robot is moved in a predetermined position, an output beam of a certain one of the through-beam-type sensors can be transmitted to a corresponding input of another sensor, by means of the reflecting mirror or mirrors. Thus, such sensors can be turned into the ON condition. In this case, the output of each sensor is connected with the external safety PLC also satisfying Category 3 of IS013849-1 and connected with the power source different from the power source used for the robot, thus having no relation to the condition of the robot. Again, in this configuration, the external PLC is provided to occasionally shut off the main power source of the robot, while optionally keeping the main power source of the robot in the ON state, based on the combination of ON/OFF conditions of the output signals. Therefore, the maximum movable range, in which the robot can be operated, while the safety PLC keeps the power source for the robot in the ON state, based on the ON/OFF conditions, as well as the maximum transfer range, in which the article to be transported, end effector and the like can be safely transferred and/or actuated, can be respectively set more accurately and efficiently. Thus, such a maximum operable and/or transfer range can be significantly reduced into a more compact area and/or space, as compared with the range that is not limited by the aforementioned control based on the ON/OFF conditions of the respective sensors. Therefore, in this example of the present invention, the safeguard apparatus for the robot can also be installed, more safely and securely.

(5) In this example (4), the reference standards referred to by the robot system include the standards derived from IS013849-1 and those referring thereto.

(6) In the above example (4), the reference standard further includes new standards including the requirement that is the same or equivalent to the requirement of the original standard of IS013849-1, in the case in which the new standards will be provided after the original standard is revised in the future.

(7) In still another example, the robot system includes the robot having three or more move axes, wherein the sensors, each satisfying Category 3 prescribed in IS013849-1, are provided to one or more of the move axes, and wherein, for example, two sensors (e.g., one sensor is the contact or non-contact projection and the other sensor is the projection detector) are provided for each move axis (e.g., the one sensor is provided to the fixed part or portion relative to the move axis, while the other sensor is provided to the movable part or portion of the move axis). In this case, the two sensors can be turned ON/OFF in response to the relative position thereof (e.g., the relative position between the projection and the projection detector). Further, contact-type or non-contact-reflection-type sensors, each satisfying the above Category 3, are provided to a part or all of the axes not provided with the aforementioned sensors, with additional projections provided to positions respectively corresponding to any given point or points (that can be provided by the composite-move of the plurality of move axes to be detected) of the distal end or intermediate portion of the arm and/or tool, such as the end effector or the like, located at the distal end of the robot. With this configuration, only when a certain axis to be detected of the robot is moved to a predetermined position, the output of the sensor or sensors can be turned into the ON condition, by means of the projection or projections. In this case, the output of each sensor is connected with the external safety PLC also satisfying Category 3 of IS013849-1 and connected with the power source different from the power source used for the robot, thus having no relation to the condition of the robot. Again, in this configuration, the external PLC is provided to occasionally shut off the main power source of the robot, while optionally keeping the main power source of the robot in the ON state, based on the combination of ON/OFF conditions of the output signals of the respective sensors. Therefore, the maximum movable range, in which the robot can be operated, while the safety PLC keeps the power source for the robot in the ON state, based on the ON/OFF conditions, as well as the maximum transfer range, in which the article to be transported, end effector and the like can be safely transferred and/or actuated, can be respectively set more accurately and efficiently. Thus, such a maximum operable and/or transfer range can be significantly reduced into a more compact area and/or space, as compared with the range that is not limited by the aforementioned control based on the ON/OFF conditions of the respective sensors. Therefore, in this example of the present invention, the safeguard apparatus for the robot can also be installed, more safely and securely.

(8) In this example (7), the reference standards referred to by the robot system include the standards derived from ISO13849-1 and those referring thereto.

(9) In the above example (8), the reference standard further includes new standards including the requirement that is the same or equivalent to the requirement of the original standard of ISO13849-1, in the case in which the new standards will be provided after the original standard is revised in the future.

One exemplary robot system of the present invention features the following points:

(A) This robot system includes the electric movable range limiting mechanism using the individual-axis-detection external sensors.

(B1) The sensors are provided to the first to fourth axis of the six axes of the robot for limiting the move of each axis.

(B2) When the sensor signal is ON, each axis having the sensor is in the movable range. This information is utilized to check the movable range or zone. Each sensor is of a transmission type, and serves to detect a slit formed in a disk provided to each axis.

(B3) In order to enhance the safety, each sensor is provided in a dual system.

(B4) The limitation of each axis move is not completely independent of the other axis moves, but performed collectively, depending on the position and/or attitude of the robot (e.g. based on composite conditions/logic). In this way, the movable range can be minimized, while preventing the robot from moving out of the range required.

(C) The mirror (or mirrors) is provided to the end effector, while the reflection sensor (or sensors) is provided in the vicinity of the robot base. With the provision such components, the position and/or attitude of the robot, especially the wrist thereof, can be checked.

(D) The above checks are all controlled by the external PLC.

Another exemplary robot system of this invention includes a detector for detecting that the robot is operated out of control and thus moves out of the predetermined movable range. This detector is provided separately from the controller used for the robot, and is composed of the sensor for monitoring the angle of each joint, sensor adapted for monitoring each position of the distal end of the robot hand and external PLC that can judge whether or not the robot is operated out of control, based on the outputs of these sensors.

Therefore, according to the above examples of this invention, the safeguard apparatus can be installed in an adequately reduced space, while satisfying the standard of ISO13849-1. Namely, this approach for installing the safeguard apparatus can securely prevent the collision of the robot against the safeguard apparatus, while enabling the safeguard apparatus to be installed in a significantly compact space with a lower cost.

The invention claimed is:

1. A robot system including a robot having a plurality of move axes and a safeguard apparatus provided independently of a control system of the robot and adapted for limiting a movable range of the robot, wherein the safeguard apparatus includes at least two individual-axis-detection external sensors configured to be respectively turned ON/OFF in response to a rotational position or a transfer position of respective at least two move axes among the plurality of move axes of the robot, and an apparatus body configured to limit a move of the robot based on a combination of ON/OFF conditions of at least two output signals obtained from the at least two individual-axis-detection external sensors.

2. The robot system according to claim 1, wherein each of the plurality of move axes of the robot is provided with at least two individual-axis-detection external sensors.

3. The robot system according to claim 1, wherein each of the individual-axis-detection external sensors includes a contact or non-contact projection and a projection detector configured to detect the projection, a relative position between the projection and the projection detector being changed according to the rotational position or the transfer position of each of the plurality of move axes of the robot.

4. The robot system according to claim 1, wherein the plurality of move axes include at least three move axes, and wherein the safeguard apparatus further includes a composite-move-detection external sensor adapted for detecting a predetermined movable position of the robot provided by composite moves of at least two move axes among the plurality of move axes of the robot.

5. A robot system including a robot having a plurality of move axes and a safeguard apparatus provided independently of a control system of the robot and adapted for limiting a movable range of the robot, wherein the safeguard apparatus includes a composite-move-detection external sensor configured to detect a predetermined movable position of the robot provided by composite moves of at least two move axes among the plurality of move axes of the robot, and an apparatus body configured to limit a move of the robot based on an output signal obtained from the composite-move-detection external sensor.

6. The robot system according to claim 4, wherein the plurality of move axes include three or more move axes, wherein the robot has an arm that can be rotated about or moved along a first axis that is one of the plurality of move axes, and wherein the composite-move-detection external sensor is configured to detect the predetermined movable position provided by the composite moves of at least two move axes other than the first axis among the plurality of move axes.

7. The robot system according to claim 6, wherein an end effector, which can be rotated about a wrist axis that is one of the plurality of move axes, is provided at a distal end of the arm, and wherein the predetermined movable position detected by the composite-move-detection external sensor is a position of the end effector.

8. The robot system according to claim 7, wherein the composite-move-detection external sensor includes a first unit configured to be rotated together with the arm rotated about the first axis, or to be moved together with the arm moved along the first axis, and a second unit configured to be moved together with the end effector, the predetermined movable position being detected by detecting that the first unit and the second unit have a predetermined positional relationship to each other.

9. The robot system according to claim 8, wherein the first unit includes a light emission part configured to emit a detection beam and a light receiving part configured to receive the detection beam, the second unit including a reflector configured to reflect the detection beam emitted from the light emission part toward the light receiving part when the robot is in the predetermined movable position.

10. The robot system according to claim 6, wherein the predetermined movable position corresponds to a position in which the arm is retracted.

11. The robot system according to claim 6, wherein the safeguard apparatus is configured to prohibit the robot from being rotated about the first axis or to prohibit the robot from being moved along the first axis, except for a case in which the robot is in the predetermined movable position.

12. The robot system according to claim 4, wherein the composite-move-detection external sensor includes a contact or non-contact projection and a projection detector configured to detect the projection, a relative position between the projection and the projection detector being changed according to a movable position of the robot.

13. The robot system according to claim 4, wherein the composite-move-detection external sensor is provided, in at least two, to one predetermined movable position.

14. The robot system according to claim 1, wherein the apparatus body includes an external safety PLC having a power source different from a power source of the robot.

15. The robot system according to claim 1, wherein the safeguard apparatus includes a power source different from a power source of the robot, the safeguard apparatus shutting off the power source of the robot when the robot moves out of a safe working area.

16. The robot system according to claim 1, wherein the safeguard apparatus is configured to limit the move of the robot, such that each transfer range of the arm of the robot, the end effector provided to the distal end of the arm and an article held by the end effector to be transported can be kept within a safe working area.

* * * * *